(12) United States Patent
Miyazaki

(10) Patent No.: US 8,641,205 B2
(45) Date of Patent: *Feb. 4, 2014

(54) LIGHT SOURCE DEVICE HAVING FIRST LIGHT SOURCE, SECOND LIGHT SOURCE, AND CONTROL SECTION TO CONTROL DRIVE TIMING OF FIRST LIGHT SOURCE AND SECOND LIGHT SOURCE SUCH THAT DRIVE PATTERN OF SECOND LIGHT SOURCE IS INVERSION OF DRIVE PATTERN OF FIRST LIGHT SOURCE, AND PROJECTION APPARATUS AND PROJECTION METHOD WHICH UTILIZE SAID LIGHT SOURCE DEVICE

(71) Applicant: Casio Computer Co., Ltd., Tokyo (JP)

(72) Inventor: Takeshi Miyazaki, Fussa (JP)

(73) Assignee: Casio Computer Co. Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/766,610

(22) Filed: Feb. 13, 2013

(65) Prior Publication Data

US 2013/0155128 A1   Jun. 20, 2013

Related U.S. Application Data

(62) Division of application No. 12/825,615, filed on Jun. 29, 2010, now Pat. No. 8,398,247.

(30) Foreign Application Priority Data

Jun. 30, 2009  (JP) ................................ 2009-156092

(51) Int. Cl.
*G03B 21/20* (2006.01)
(52) U.S. Cl.
USPC ........................................................... 353/85

(58) Field of Classification Search
USPC ................................................ 353/30, 31, 85
See application file for complete search history.

(56) References Cited

U.S. PATENT DOCUMENTS

| 7,322,703 B2 | 1/2008 | Matsui |
| 7,532,176 B2 | 5/2009 | Imade |

(Continued)

FOREIGN PATENT DOCUMENTS

| JP | 2004-334055 A | 11/2004 |
| JP | 2004-341105 A | 12/2004 |

(Continued)

OTHER PUBLICATIONS

Japanese Office Action dated May 14, 2013 (and English translation thereof) in counterpart Japanese Application No. 2009-156092.

(Continued)

*Primary Examiner* — Thanh Luu
*Assistant Examiner* — Renee Naphas
(74) *Attorney, Agent, or Firm* — Holtz, Holtz, Goodman & Chick

(57) ABSTRACT

A light source device includes a first light source configured to emit light within a first wavelength band, a second light source configured to emit light within a second wavelength band, and a light source control section configured to control drive timing of the first light source with a first drive pattern, and to control drive timing of the second light source with a second drive pattern which is an inverted pattern of the first drive pattern of the first light source, such that a light emission period for light-source light using light emitted by the second light source is positioned between light emission periods for the light-source light emitted by the first light source, and such that a frequency of the light-source light using light emitted by the second light source is higher than a frequency of light emitted by the first light source.

11 Claims, 6 Drawing Sheets

(56) References Cited

U.S. PATENT DOCUMENTS 8,398,247 B2 * 3/2013 Miyazaki ........................ 353/85
2010/0277697 A1 11/2010 Duncan et al.

FOREIGN PATENT DOCUMENTS

| JP | 2006-017801 A | 1/2006 |
| JP | 2006-023436 A | 1/2006 |
| JP | 2007-218956 A | 8/2007 |
| JP | 2008-261998 A | 10/2008 |

OTHER PUBLICATIONS

Korean Office Action dated Mar. 26, 2012 (and English translation thereof) in counterpart Korean Application No. 10-2010-0062572.

* cited by examiner

LIGHT SOURCE DEVICE HAVING FIRST LIGHT SOURCE, SECOND LIGHT SOURCE, AND CONTROL SECTION TO CONTROL DRIVE TIMING OF FIRST LIGHT SOURCE AND SECOND LIGHT SOURCE SUCH THAT DRIVE PATTERN OF SECOND LIGHT SOURCE IS INVERSION OF DRIVE PATTERN OF FIRST LIGHT SOURCE, AND PROJECTION APPARATUS AND PROJECTION METHOD WHICH UTILIZE SAID LIGHT SOURCE DEVICE

CROSS-REFERENCE TO RELATED APPLICATIONS

This is a Divisional of U.S. application Ser. No. 12/825,615, filed Jun. 29, 2010, which is based upon and claims the benefit of priority from prior Japanese Patent Application No. 2009-156092, filed Jun. 30, 2009, the entire contents of both of which are incorporated herein by reference.

BACKGROUND OF THE INVENTION

1. Field of the Invention

The present invention relates to a light source device, a projection apparatus, and a projection method that are suitable for a Digital Light Processing (DLP [registered trademark]) data projector apparatus and the like.

2. Description of the Related Art

Displaying colors with a projection display apparatus requires planar light sources that emit the primary colors of red, green, and blue, and spatial optical modulators corresponding to the primary colors. Therefore, the increase in the number of parts hinders reduction in the size, weight, or cost of the entire device. For example, Jpn. Pat. Appln. KOKAI Publication No. 2004-341105 discloses the technology in which a light-emitting diode that emits ultraviolet light is used as a light source and the ultraviolet light is emitted to a color wheel, thereby producing visible light corresponding to red, green, and blue. Specifically, a visible light reflection film that transmits ultraviolet light and reflects visible light is formed on the light source side of the color wheel, and a phosphor layer that emits visible light corresponding to red, green, and blue by being illuminated with ultraviolet light is formed on the back of the color wheel.

However, when the invention described in Jpn. Pat. Appln. KOKAI Publication No. 2004-341105 mentioned above is adopted, the presently known various red phosphors are significantly lower in light emission efficiency, compared to green and blue phosphors, resulting in inadequate red luminance.

When a brighter projected image is formed by giving priority to luminance, white balance is lost, with the result that color reproducibility degrades. Conversely, giving priority to white balance and hence color reproducibility decreases the overall luminance of a projected image because of the low luminance of the red image, resulting in a dark image.

The present invention has been made in view of the foregoing problems of conventional technologies. It is accordingly an object of the present invention to provide a light source device, a projection apparatus, and a projection method, which convert light from a light source into a plurality of colors by using, e.g., a color wheel, use another light source, and stabilize drive while taking into account the light emission characteristics of each of the light sources, thereby making color reproducibility compatible with the brightness of a projected image.

BRIEF SUMMARY OF THE INVENTION

According to one aspect of the present invention, there is provided a light source device comprising: a first light source configured to emit light within a first wavelength band; a light-source light production section configured to sequentially produce light-source light of a plurality of colors at predetermined frequency by using light emitted by the first light source; a second light source configured to emit light within a second wavelength band different from the first wavelength band; and a light source control section configured to control drive timing for each of the first and second light sources such that a light emission period for light-source light using light emitted by the second light source is positioned between light emission periods for the light-source light of the plurality of colors produced by the light-source light production section and that the light-source light using light emitted by the second light source has a frequency higher than that of the light-source light production section.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
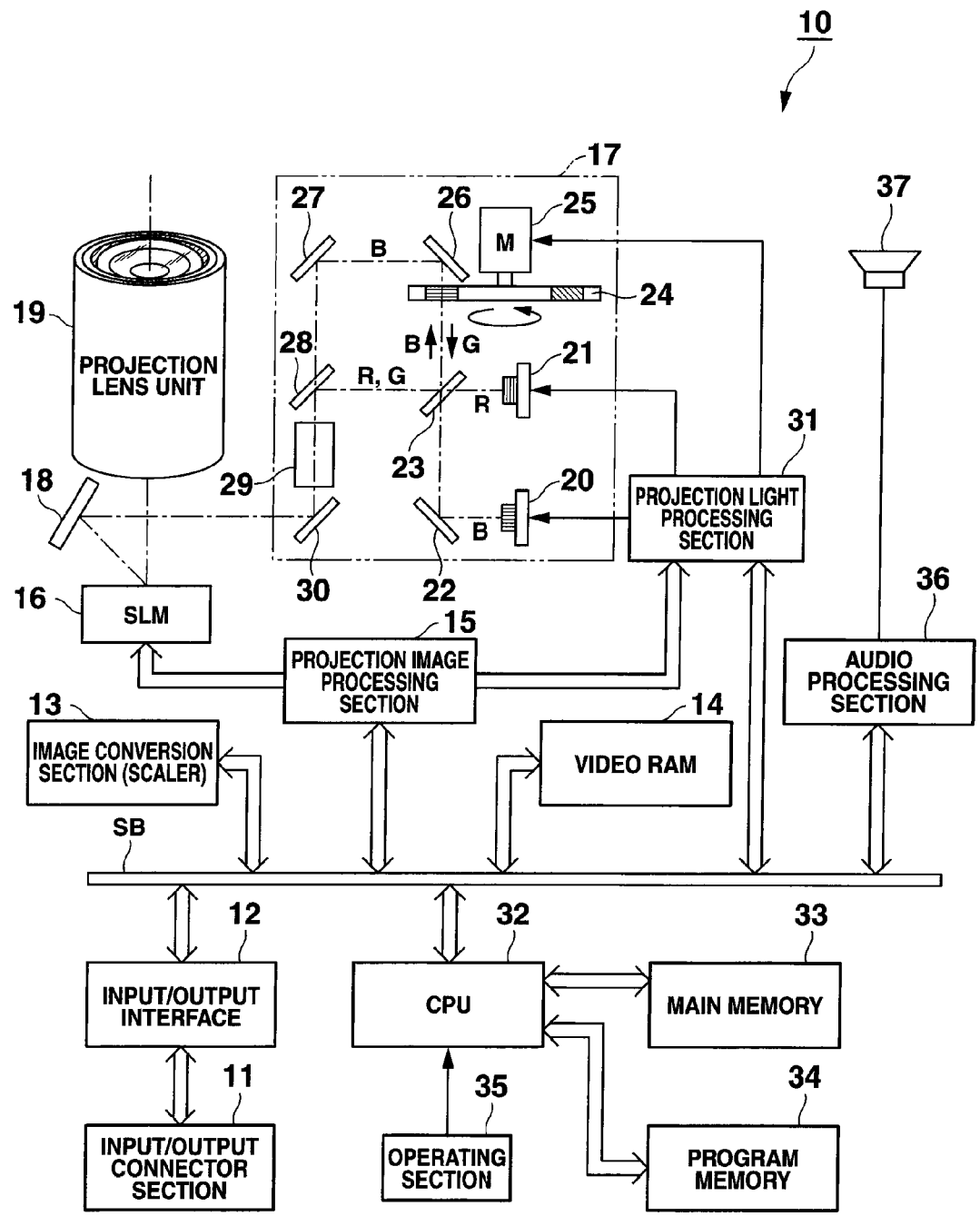
FIG. 1 is a block diagram illustrating the overall configuration of the function of a circuit provided for a data projector apparatus according to one embodiment of the present embodiment.

Preferred embodiments of the present invention will now be described with reference to the drawings. In the embodiments described below, various technically preferred limits are set for carrying out the invention, but the scope of the invention is not limited to the following embodiments or examples shown in the drawings.

Using an example where the present invention is applied to a Digital Light Processing (DLP [registered mark]) data projector apparatus, the present invention will be described with reference to the drawings.

FIG. 1 is a block diagram schematically illustrating the configuration of the function of an electronic circuit included in a data projector apparatus 10 according to the present embodiment.

An input/output connector section 11 includes, for example, an RCA [Radio Corporation of America] pin jack video input terminal, D-sub 15 RGB input terminal, and Universal Serial Bus (USB) connector.

Image signals of various specifications input from the input/output connector section 11 are input to an image conversion section 13 (generally called a scaler) via an input/output interface 12 and a system bus SB.

The image conversion section 13 converts the input image signals into uniform image signals of predetermined format suitable for projection, then stores these image signals in a video RAM 14 (i.e., a buffer memory for display) as needed, and transmits them to a projection image processing section 15.

At this time, data such as symbols representing various operating conditions for on-screen display (OSD) are superposed on the image signals by the video RAM 14 if necessary, and the image signals thus processed are transmitted to the projection image processing section 15.

According to the transmitted signals, the projection image processing section 15 drives and displays a micromirror element 16 (i.e., spatial light modulation [SLM] element) through a higher-speed time division drive determined by multiplying the frame rate (which is based on a predetermined format), for example, 120 frames/sec, the number of components into which color is divided, and gradation for display.

The micromirror element 16 individually on/off operates the angles of inclination of a plurality of minute mirrors at high speed. The minute mirrors provided for, for example, extended graphics array (XGA) (1024 horizontal pixels×768 vertical pixels) are arranged in an array. Thereby the micromirror element 16 forms an optical image with light reflected by the micromirrors.

Meanwhile, a light source section 17 emits red (R), green (G), and blue (B) primary color components in a circulatory and time-division manner. The primary color components from the light source section 17 are totally reflected by a mirror 18 and the micromirror element 16 is thereby illuminated by the light components.

Then, an optical image is formed with the light components reflected by the micromirror element 16. The optical image thus formed is projected and displayed on a screen (not shown), which is a projection target, via a lens unit 19.

The light source section 17, a detailed configuration of which will be described below, comprises two light sources, namely, a semiconductor laser 20 that emits blue laser light and an LED 21 that emits red light.

The blue laser light emitted by the semiconductor laser 20 is totally reflected by a mirror 22, then transmitted through a dichroic mirror 23, and converges on one point of the circumference of a color wheel 24, thereby illuminating the color wheel. A motor 25 rotates the color wheel 24. On the circumference of the color wheel 24 illuminated by the laser light, a green phosphor reflective plate and a blue diffusing plate are combined in the shape of a ring.

When the green phosphor reflective plate of the color wheel 24 is in a place illuminated by laser light, green light is excited by illumination with laser light. The excited green light is reflected by the color wheel 24, and is also reflected by the dichroic mirror 23. Thereafter, this green light is reflected by another dichroic mirror 28, and is formed into a luminous flux of substantially uniformly distributed luminance by an integrator 29. Then, the luminous flux is totally reflected by a mirror 30 and transmitted to the mirror 18.

When the diffusing plate is located in a place illuminated by laser light, the laser light is passed through the color wheel 24 while being diffused by the diffusing plate, and is then totally reflected by mirrors 26 and 27. Thereafter, this blue light is transmitted through the dichroic mirror 28 and formed into a luminous flux of substantially uniformly distributed luminance by the integrator 29. Then, the luminous flux is totally reflected by the mirror 30 and transmitted to the mirror 18.

Red light emitted by the LED 21 is transmitted through the dichroic mirror 23 and then reflected by the dichroic mirror 28, and formed into a luminous flux of substantially uniformly distributed luminance by the integrator 29. Then, the luminous flux is totally reflected by the mirror 30 and transmitted to the mirror 18.

As described above, the dichroic mirror 23 has the spectral property of reflecting green light while transmitting blue light and red light.

In addition, the dichroic mirror 28 has the spectral property of reflecting red light and green light while transmitting blue light.

A projection light processing section 31 wholly controls the light emission timings of the semiconductor laser 20 and LED 21 in the light source device 17, and the rotation of the color wheel 24 by the motor 25. According to the timing of image data provided by the projection image processing section 15, the projection light processing section 31 controls the light emission timings of the semiconductor laser 20 and LED 21, and rotation of the color wheel 24.

A CPU 32 controls operation of all the circuits. The CPU 32 uses a main memory 33 comprising a DRAM, and a program memory 34 comprising an electrically writable nonvolatile memory that stores operating programs and various fixed data, etc., to control operations inside the data projector apparatus 10.

The CPU 32 performs various projection operations according to key operating signals output from an operating section 35.

The operating section 35 includes a key operating section provided on the main body of the data projector apparatus 10 and a laser receiving section that receives infrared light from a remote controller, not shown, specially provided for the data projector apparatus 10. A key operating signal based on a key operated by a user through the key operating section of the main body or through the remote controller is directly output to the CPU 32 by the operating section 35.

In addition to the key operating section and remote controller, the operating section 35 comprises, for example, a focus adjustment key, zoom adjustment key, input switching key, menu key, cursor (←, →, ↑, ↓) keys, set key, cancellation key, etc.

Further, the CPU 32 is connected to an audio processing section 36 via the system bus SB. The audio processing section 36 comprises a pulse code modulation (PCM) audio source circuit. The audio processing section 36 analogizes audio data provided for a projection operation, drives a loudspeaker 37 to intensify and emit audio, or produces a beep if necessary.

Figure 2:
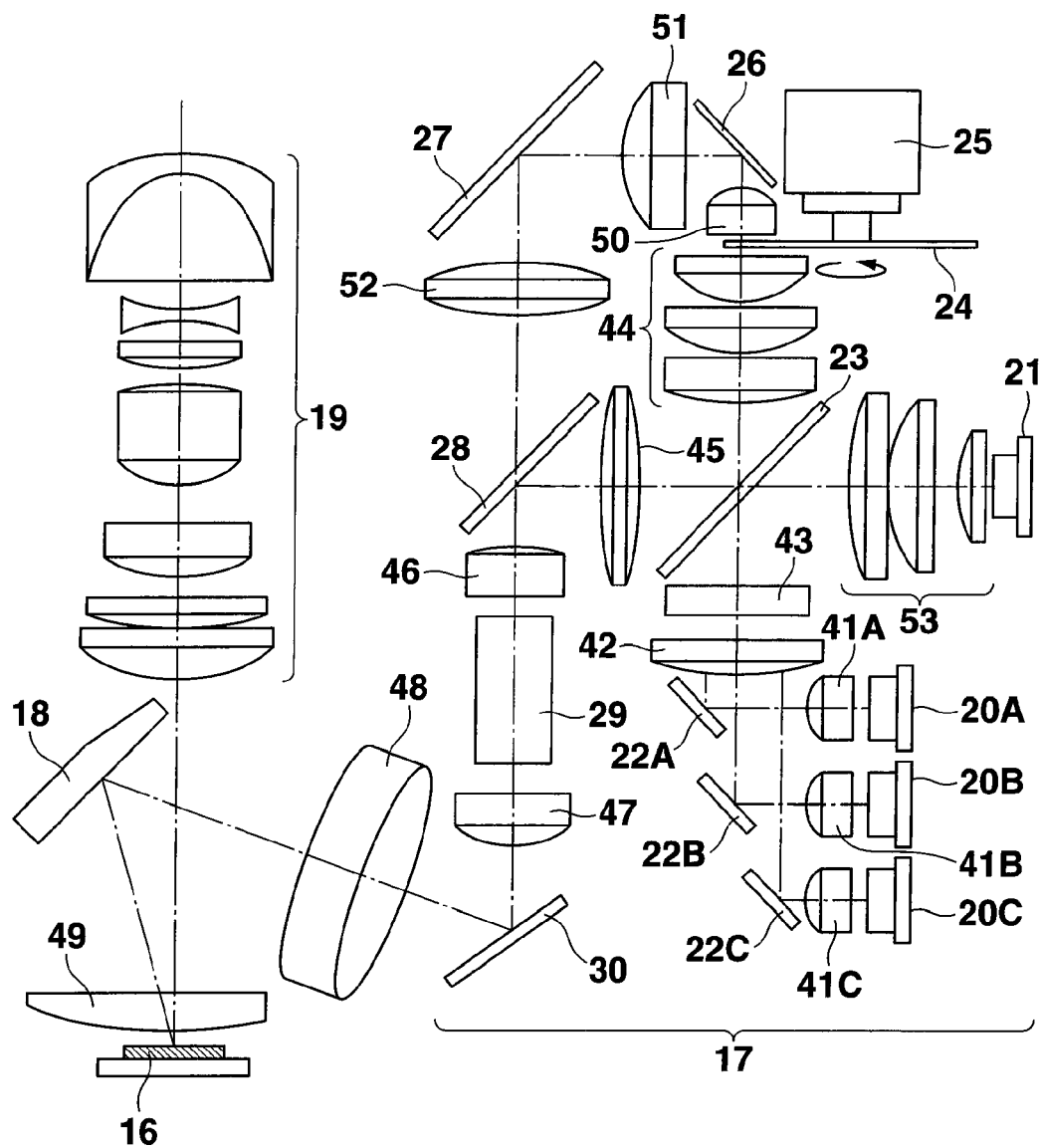
FIG. 2 mainly illustrates the detailed optical configuration of a light source system according to the embodiment.

FIG. 2 mainly illustrates an example of the detailed configuration of an optical system of the light source section 17. FIG. 2 shows a planar layout of the configuration of the light source section 17.

In this case, for example, three semiconductor lasers 20A to 20C with the same light emission characteristics are provided. Each of the semiconductor lasers 20A to 20C emits blue laser light having a wavelength of, for example, 450 nm.

The blue light emitted by the semiconductor lasers 20A to 20C is totally reflected by corresponding mirrors 22A to 22C via lenses 41A to 41C, transmitted through the dichroic mirror 23 via lenses 42 and 43, and then illuminates the color wheel 24 via a lens group 44.

Figure 3:
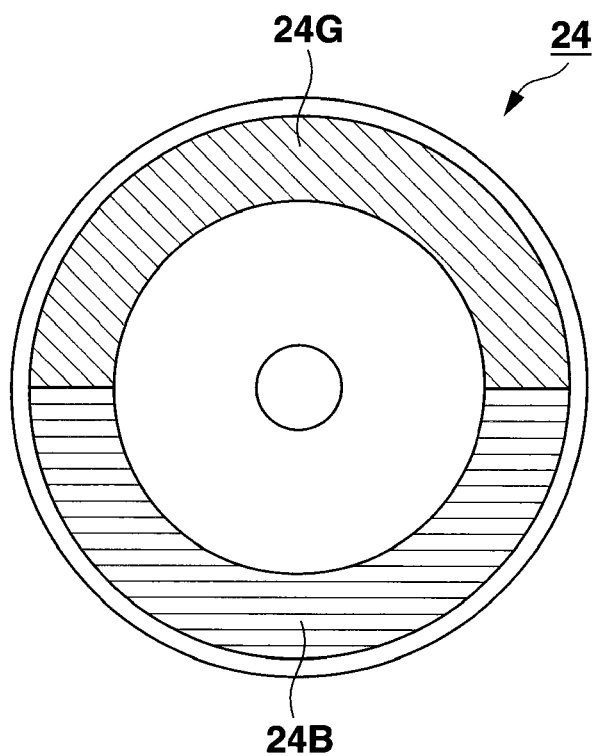
FIG. 3 is a plan view of the configuration of a fluorescent color wheel according to the embodiment.

FIG. 3 illustrates the configuration of the color wheel 24 according to the present embodiment. As shown in FIG. 3, on the color wheel 24, one ring is formed from a combination of a green phosphor reflective plate 24G and a blue diffusing plate 24B, each of which is a semicircular ring with a central angle of 180°.

When the green phosphor reflective plate 24G of the color wheel 24 is in a place illuminated by blue light, green light with a wavelength band, the central wavelength of which is, for example, about 530 nm is excited by the illumination. The excited green light is reflected by the color wheel 24 and then also reflected by the dichroic mirror 23 via the lens group 44.

The green light reflected by the dichroic mirror 23 is further reflected by the dichroic mirror 28 via a lens 45. Then, this light is formed into a luminous flux of substantially uniformly distributed luminance by the integrator 29 via a lens 46. The luminous flux is then totally reflected by the mirror 30 via a lens 47 and sent to the above-mentioned mirror 18 via a lens 48.

The green light totally reflected by the mirror 18 illuminates the micromirror element 16 via a lens 49. Subsequently, an optical image for a green component is formed with the reflected green light, and is projected outward via the lens 49 and projection lens unit 19.

In addition, when the blue diffusing plate 24B of the color wheel 24 is in a place illuminated by blue light, the blue light is transmitted through the color wheel 24 while being diffused by the diffusing plate 24B. Then, the blue light is totally reflected by the mirror 26 via a lens 50 disposed behind the color wheel 24.

Further, the blue light is totally reflected by the mirror 27 via a lens 51, and transmitted through the dichroic mirror 28 via a lens 52. Thereafter, this light is formed into a luminous flux of substantially uniformly distributed luminance by the integrator 29 via the lens 46. The luminous flux is then totally reflected by the mirror 30 via the lens 47 and sent to the above-mentioned mirror 18 via the lens 48.

The LED 21 produces red light having a wavelength of, for example, 620 nm. The red light emitted by the LED 21 is transmitted through the dichroic mirror 23 via a lens group 53, and reflected by the dichroic mirror 28 via the lens 45. Further, this light is formed into a luminous flux of substantially uniformly distributed luminance by the integrator 29 via the lens 46. The luminous flux is then totally reflected by the mirror 30 via the lens 47 and sent to the above-mentioned mirror 18 via the lens 48.

Next, operation of the embodiment will be described.

In this case, the time ratio among the R, G, and B primary color images composing one frame of a color image to be projected is 1:1:1. That is, if a time ratio r:g:b at which each of the R, G, and B primary color images is projected is replaced by the central angle of the color wheel 24 relative to one rotation of the color wheel 24 through 360°, 120°:120°:120° is yielded.

Figure 4:
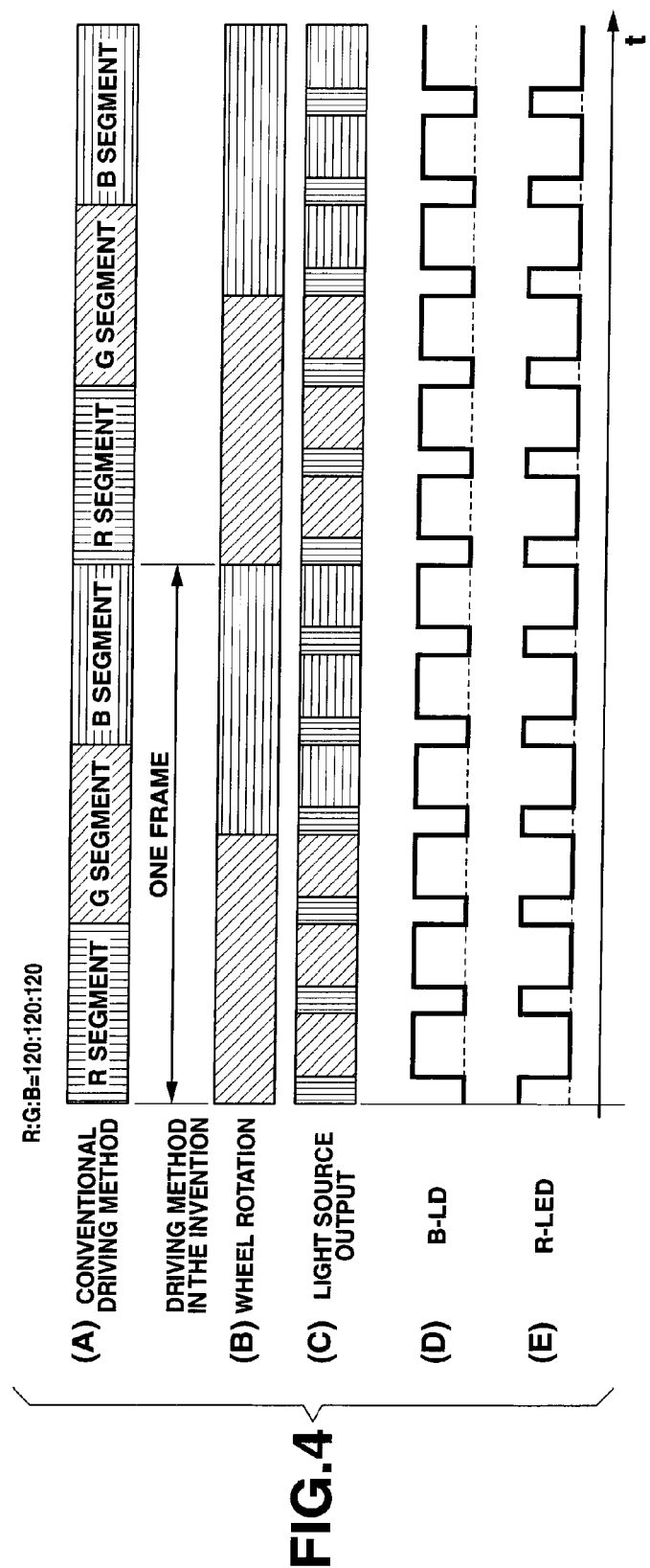
FIG. 4 is a timing chart illustrating the content of a driving process for an optical system in one image frame according to the embodiment.

The drive timing of the color wheel by a conventional, general drive method is shown in FIG. 4(A) for reference. A conventional, general color wheel is driven such that a cycle of R, G, and B segments corresponds to one frame.

By comparison, the color wheel 24 in the present embodiment is configured such that the green phosphor reflective plate 24G and the blue diffusing plate 24B bisect the circumference, as shown in FIG. 3. Therefore, the projection light processing section 31 ensures that one rotation corresponding to the two segments is synchronized with one frame, as shown in FIG. 4(B).

The projection light processing section 31 trisects the period of the front half frame in which the green phosphor reflective plate 24G of the color wheel 24 is present in the optical path of blue laser light emitted from each of the semiconductor lasers 20A to 20C, and activates and drives the LED 21 in the first ⅓ of each equal period, thereby producing red light.

At this time, in synchronization with the activation of the LED 21, the semiconductor lasers 20A to 20C stop the emission of blue laser light.

Similarly, the projection light processing section 31 trisects the period of the last half frame in which the blue diffusing plate 24B of the color wheel 24 is present in the optical path of blue laser light emitted from each of the semiconductor lasers 20A to 20C, and activates and drives the LED 21 in the first ⅓ of each equal period, thereby producing red light.

At this time, in synchronization with the activation of the LED 21, the semiconductor lasers 20A to 20C stop the emission of blue laser light.

FIG. 4(D) illustrates the timing of emitting blue laser light from the semiconductor lasers 20A to 20C, and FIG. 4(E) illustrates the timing of producing red light with the LED 21.

Accordingly, the pattern of switching R, G, and B primary color components illuminating the micromirror element 16 as the light source section 17 is illustrated in FIG. 4(C).

Thus, a light emission period for red light emitted through the activation of the LED 21 is positioned between light emission periods for blue and green light that is produced by blue laser light emitted by the semiconductor lasers 20A to 20C according to the segment configuration of the color wheel 24. In this case, the period of interruption during which red light is emitted is divided such that the frequency of red light is, for example, six times higher than the frequency of blue light and the frequency of green light.

When the lighting period for each color is converted into the central angle of the color wheel 24, the lighting period for red light is 20°×6=120°, the lighting period for green light is 40°×3=120°, and the lighting period for blue light is also 40°×3=120°, thus equally trisecting one frame 360° into 120° each of R, G, B.

The formula below expresses the duty ratio of a period Gr during which the micromirror element 16 forms and projects an image with red light by activating the LED 21 while temporarily stopping oscillation of the semiconductor lasers 20A to 20C during the period in which the green phosphor reflective plate 24G of the color wheel 24 is present in the axes of light from the semiconductor lasers 20A to 20C (i.e., light sources), as described above.

$Gr=r/(r+g+b)$

This formula uses a time ratio of r:g:b, at which each of the R, G, and B primary color images is projected relative to one rotation of the color wheel through 360°.

By comparison, the formula below expresses the duty ratio of a period Gg during which the micromirror element 16 forms and projects an image with reflected green light by oscillating the semiconductor lasers 20A to 20C while temporarily stopping the activation of the LED 21 during the period in which the green phosphor reflective plate 24G of the color wheel 24 is present in the axes of light from the semiconductor lasers 20A to 20C.

$Gg=(g+b)/(r+g+b)$.

Similarly, the formula below expresses the duty ratio of a period Br during which the micromirror element 16 forms and projects an image with red light by activation of the LED 21 while temporarily stopping oscillation of the semiconductor lasers 20A to 20C during the period in which the blue phosphor diffusing plate 24B of the color wheel 24 is present in the axes of light from the semiconductor lasers 20A to 20C (i.e., light sources).

$$Br = r/(r+g+b)$$

By comparison, the formula below expresses the duty ratio of a period Bb during which the micromirror element 16 forms and projects an image with blue light (i.e., transmission light) by oscillating the semiconductor lasers 20A to 20C while temporarily stopping the activation of the LED 21 during the period in which the blue diffusing plate 24B of the color wheel 24 is present in the axes of light from the semiconductor lasers 20A to 20C.

$$Bb = (g+b)/(r+g+b)$$

It is known that the LED 21 that produces red light decreases in light emission efficiency as heat resistance increases with increase in temperature due to continuous activation of the LED 21. However, dividing a light emission period and conducting high-frequency drive make it possible to avoid decrease in light emission efficiency, thus ensuring light emission with stable luminance.

It is also known that the semiconductor lasers 20A to 20C may decrease in light emission efficiency due to a temperature increase resulting from continuous oscillation, although the degree of the decrease is not as high as that of the LED 21. Likewise, dividing a light emission period and conducting high-frequency drive make it possible to avoid decrease in light emission efficiency, thus ensuring light emission with stable luminance.

In synchronization with light emission drive in such a light source section 17, the micromirror element 16 executes a gradation drive for each primary color image.

As described above, in view of the problem with red phosphor that it emits light by exciting laser light that is low in light emission luminance compared to that emitted by other color phosphors, the present embodiment uses the semiconductor lasers 20A to 20C that emit blue light as a first light source. On the color wheel 24, blue light emitted by the first light source is converted into blue and green light to be used as projection light. Red light is emitted by the LED 21, which produces red light as a second light source. Such an optical system configuration allows optical frequency drive that takes into account the light emission characteristics of each light source, thereby increasing light emission efficiency and hence stability of the operation. Accordingly, the present embodiment can make color reproducibility compatible with projected image brightness.

Additionally, in the present embodiment, a color break-up phenomenon, which occurs in a DLP projector, is reliably suppressed by synchronizing the timing of activation of the LED 21 that produces red light without the color wheel 24, with the timing of switching between the green phosphor reflective plate 24G and blue diffusing plate 24B of the color wheel 24. Accordingly, degraded image quality can be avoided.

MODIFIED EXAMPLE

Next, another example of the configuration of the color wheel 24 will be described.

Figure 5:
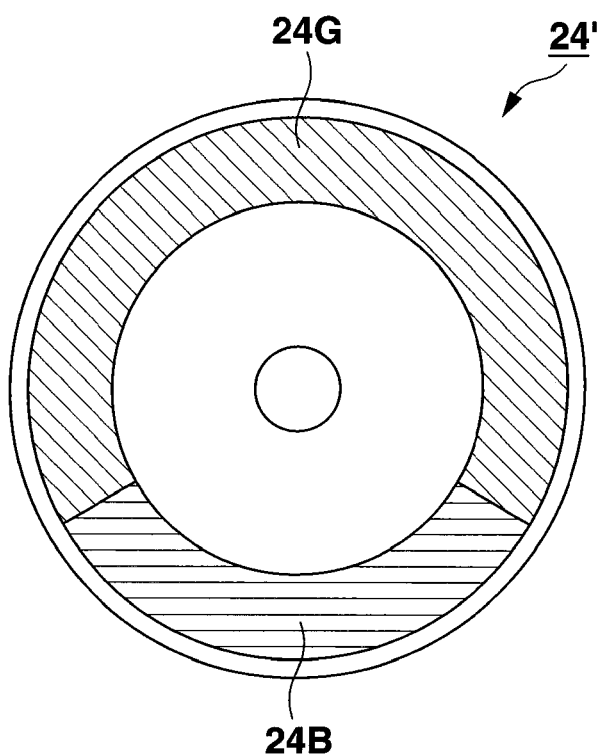
FIG. 5 is a plan view of another configuration of the fluorescent color wheel according to the embodiment.

FIG. 5 shows the configuration of a color wheel 24' different from the color wheel 24. As shown in FIG. 5, on the color wheel 24', a green phosphor reflective plate 24G with a central angle of 240° and a blue diffusing plate 24B with a central angle of 120° form one ring so that the green phosphor reflective plate 24G and the blue diffusing plate 24B have a ratio of 2:1.

The wavelength of blue laser light emitted by each of the semiconductor lasers 20A to 20C, the wavelength of green light excited by the green phosphor reflective plate 24G of the color wheel 24' illuminated by the blue laser light, and the wavelength of red light produced by the LED 21 are the same as those described above.

An operation involving this color wheel 24' will now be discussed.

In this case, the time ratio at which the R, G, and B primary color images composing one frame of a color image to be projected is set to 1:2:1. That is, if the time ratio at which each of the R, G, and B primary color images is projected is replaced by the central angle of the color wheel 24' relative to one rotation of the color wheel 24' through 360°, 90°:180°:90° is yielded.

Figure 6:
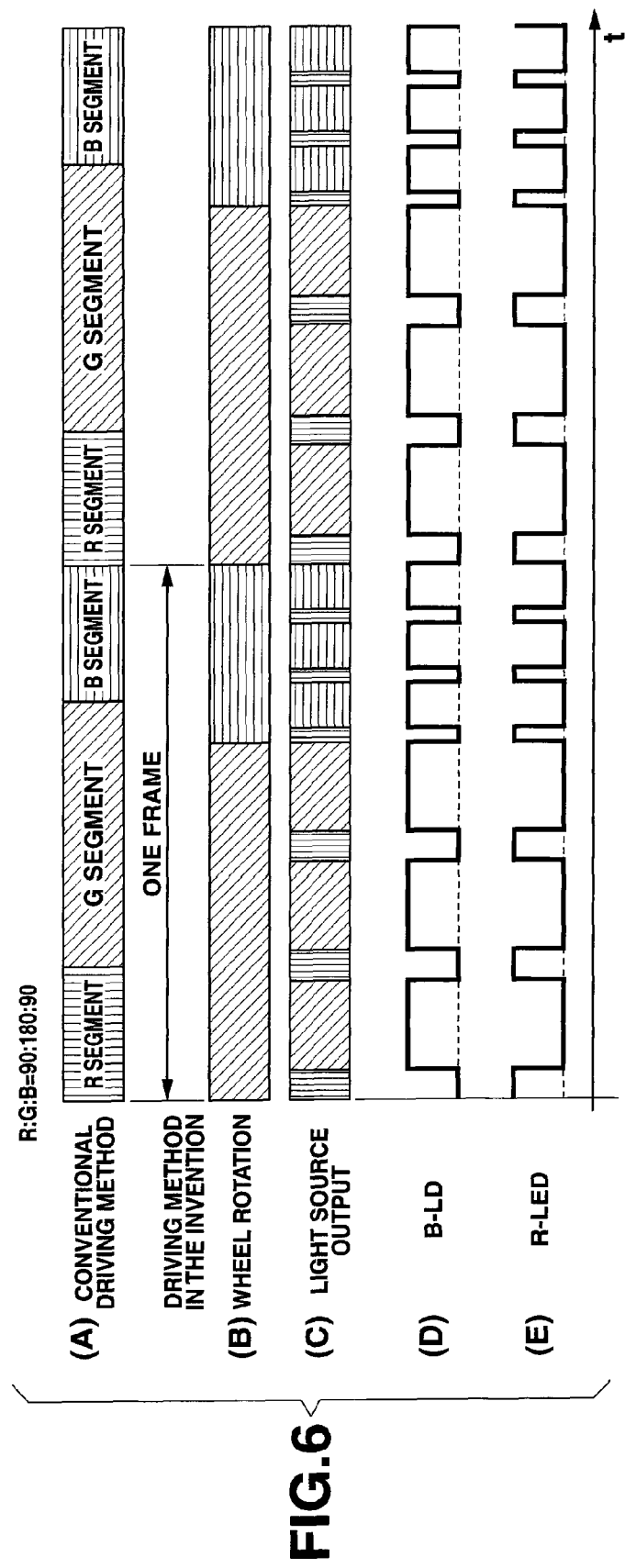
FIG. 6 is a timing chart illustrating the content of another driving process for the optical system in one image frame according to the embodiment.

The drive timing of a color wheel by a conventional, general drive method is shown in FIG. 6(A) for reference. The conventional, general color wheel is driven such that a cycle of R, G, and B segments corresponds to one frame.

By comparison, the color wheel 24' in the present embodiment is configured such that the green phosphor reflective plate 24G and the blue diffusing plate 24B bisect the circumference, as shown in FIG. 5, although their proportions are different. Therefore, the projection light processing section 31 ensures that one rotation corresponding to the two segments is synchronized with one frame, as shown in FIG. 6(B).

The projection light processing section 31 trisects the period of the front ⅔ frame in which the green phosphor reflective plate 24G of the color wheel 24' is present in the optical path of blue laser light emitted from each of the semiconductor lasers 20A to 20C, and activates and drives the LED 21 in the first ⅓ of each equal period, thereby producing red light.

At this time, in synchronization with the activation of the LED 21, the semiconductor lasers 20A to 20C stop the emission of blue laser light.

Similarly, the projection light processing section 31 trisects the period of the last ⅓ frame in which the blue diffusing plate 24B of the color wheel 24' is present in the optical path of blue laser light emitted from each of the semiconductor lasers 20A to 20C, and activates and drives the LED 21 in the first ⅓ of each equal period, thereby producing red light.

At this time, in synchronization with the activation of the LED 21, the semiconductor lasers 20A to 20C stop the emission of blue laser light.

FIG. 6(D) illustrates the timing of emitting blue laser light from the semiconductor lasers 20A to 20C, and FIG. 6(E) illustrates the timing of emitting red light from the LED 21.

Accordingly, the pattern of switching R, G, and B primary color components illuminating the micromirror element 16 as the light source section 17 is illustrated in FIG. 6(C).

Thus, a light emission period for red light emitted through the activation of the LED 21 is positioned between light emission periods for blue and green light that is produced by blue laser light emitted by the semiconductor lasers 20A to 20C according to the segment configuration of the color wheel 24. In this case, the period of interruption during which red light is emitted is divided such that the frequency of red light is, for example, six times higher than the frequency of blue light and the frequency of green light.

When a lighting period for each color is converted into the central angle of the color wheel 24', the lighting period for red light is 20°×3+10×3=90°, the lighting period for green light is 60°×3=180°, and the lighting period for blue light is 30°×3=90°, thus, dividing one frame 360° into R, G, B at a ratio of 1:2:1.

In synchronization with light emission drive for such a light source section 17, the micromirror element 16 executes gradation drive for each primary color image.

In the modified example described above, since the ratio of the period for the green phosphor reflective plate 24G of the color wheel 24' and the ratio of the period for the blue diffusing plate 24B are different from each other, the light emission period for the LED 21 is positioned between the period for the green phosphor reflective plate 24G and the period for the blue diffusing plate 24B in the same ratio but at different times. Accordingly, the time ratio among the R, G, and B of one frame can be suitably maintained.

In the foregoing embodiment, a description has been given using an example where, while the semiconductor lasers 20A to 20C emit blue laser light, thereby causing the color wheel 24 (24') to produce blue light and green light, the LED 21 produces red light. However, the present invention is not limited to this but can equally be applied to a projection apparatus that uses a light source section or the like, which is designed such that if the primary colors produced by a single light source are unequal in luminance, another light source compensates for the unequal luminance.

The description given above is an example where the present invention is applied to a DLP (registered trademark) data projector apparatus. However, the present invention can equally be applied to, for instance, a liquid crystal projector that forms an optical image by using a transmission-type monochrome liquid crystal panel.

For example, even when some of the constituent elements of the configurations of the embodiments described above are omitted, this modified configuration is included in the present invention as long as the same effect can be obtained.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A light source device comprising:
a first light source configured to emit light within a first wavelength band;
a second light source configured to emit light within a second wavelength band; and
a light source control section configured to control drive timing of the first light source with a first drive pattern, and to control drive timing of the second light source with a second drive pattern which is an inverted pattern of the first drive pattern of the first light source, such that a light emission period for light-source light using light emitted by the second light source is positioned between light emission periods for the light-source light emitted by the first light source, and such that a frequency of the light-source light using light emitted by the second light source is higher than a frequency of light emitted by the first light source.

2. The light source device according to claim 1, wherein the light source control section intermittently drives the first light source at predetermined time intervals, and intermittently drives the second light source such that the second light source is activated during intermittent periods of the first light source.

3. The light source device according to claim 1, wherein the light source control section controls the drive timing for each of the first light source and the second light source such that the light emission period for the light-source light using light emitted by the second light source is positioned between the light emission periods for the light-source light emitted by the first light source, and such that the frequency of the light-source light using light emitted by the second light source is synchronized with the frequency of light emitted by the first light source and the frequency of the light-source light using light emitted by the second light source is a plurality of times higher than the frequency of light emitted by the first light source.

4. The light source device according to claim 1, further comprising a third light source configured to emit light within a third wavelength band;
wherein the light source control section is configured to control drive timing of the second light source with the second drive pattern, and to control drive timing of the third light source with a third drive pattern which is an inverted pattern of the second drive pattern of the second light source, such that a light emission period for light-source light using light emitted by the second light source is positioned between light emission periods for the light-source light emitted by the third light source, and such that a frequency of the light-source light using light emitted by the second light source is higher than a frequency of light emitted by the third light source.

5. The light source device according to claim 4, wherein the third light source comprises a light-source light production section configured to produce light-source light within the third wavelength band by using light emitted by the first light source.

6. A projection apparatus comprising:
a first light source configured to emit light within a first wavelength band;
a second light source configured to emit light within a second wavelength band;
a light source control section configured to control drive timing of the first light source, and to control drive timing of the second light source;
an input section configured to input an image signal; and
a projection section configured to use light-source light emitted based on the control of the light source control section and to form and project a color optical image corresponding to the image signal input through the input section;
wherein the light source control section is configured to control drive timing of the first light source with a first drive pattern, and to control drive timing of the second light source with a second drive pattern which is an inverted pattern of the first drive pattern of the first light source, such that a light emission period for light-source light using light emitted by the second light source is positioned between light emission periods for the light-source light emitted by the first light source, and such that a frequency of the light-source light using light emitted by the second light source is higher than a frequency of light emitted by the first light source.

7. The projection apparatus according to claim 6, wherein the light source control section intermittently drives the first light source at predetermined time intervals, and intermittently drives the second light source such that the second light source is activated during intermittent periods of the first light source.

8. The projection apparatus according to claim 6, wherein the light source control section controls the drive timing for each of the first light source and the second light source such that the light emission period for the light-source light using light emitted by the second light source is positioned between the light emission periods for the light-source light emitted by the first light source, and such that the frequency of the light-source light using light emitted by the second light source is synchronized with the frequency of light emitted by the first light source and the frequency of the light-source light using light emitted by the second light source is a plurality of times higher than the frequency of light emitted by the first light source.

9. The projection apparatus according to claim 6, further comprising a third light source configured to emit light within a third wavelength band;

wherein the light source control section is configured to control drive timing of the second light source with the second drive pattern, and to control drive timing of the third light source with a third drive pattern which is an inverted pattern of the second drive pattern of the second light source, such that a light emission period for light-source light using light emitted by the second light source is positioned between light emission periods for the light-source light emitted by the third light source, and such that a frequency of the light-source light using light emitted by the second light source is higher than a frequency of light emitted by the third light source.

10. The projection apparatus according to claim 9, wherein the third light source comprises a light-source light production section configured to produce light-source light within the third wavelength band by using light emitted by the first light source.

11. A projection method for a projection apparatus including a first light source configured to emit light within a first wavelength band, a second light source configured to emit light within a second wavelength band, a light source control section configured to control drive timing of each of the first light source and the second light source, an input section configured to input an image signal, and a projection section configured to use the light-source light emitted based on the control of the light source control section and form and project a color optical image corresponding to the image signal input through the input section, the method comprising:

controlling drive timing of the first light source with a first drive pattern and controlling drive timing of the second light source with a second drive pattern which is an inverted pattern of the first drive pattern of the first light source, such that a light emission period for light-source light using light emitted by the second light source is positioned between light emission periods for the light-source light emitted by the first light source, and such that a frequency of the light-source light using light emitted by the second light source is higher than a frequency of light emitted by the first light source.

* * * * *